D. M. ENGEL.
COUPLING FOR AGRICULTURAL MACHINERY.
APPLICATION FILED AUG. 1, 1912.
1,060,441.
Patented Apr. 29, 1913.
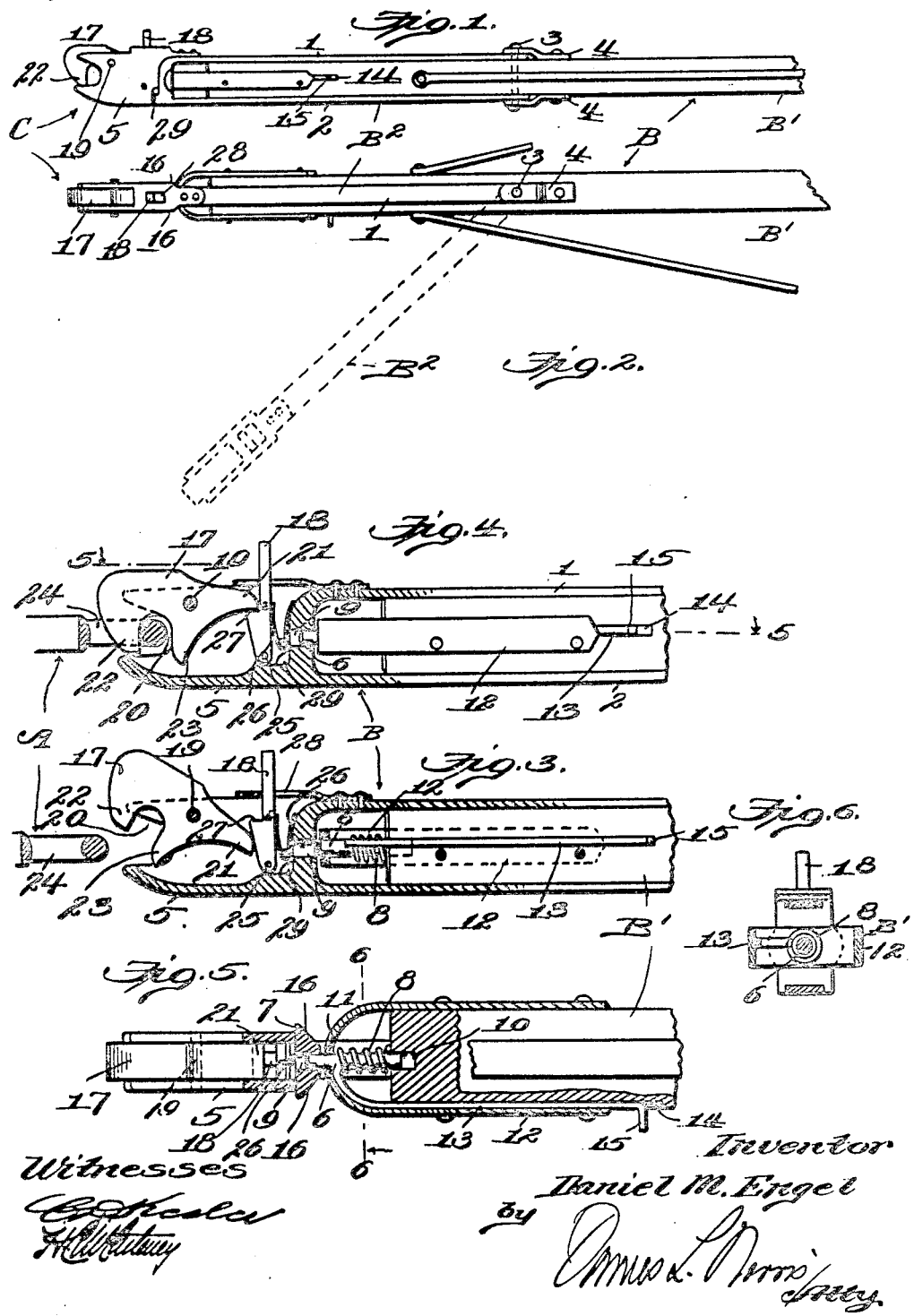
Witnesses
Inventor
Daniel M. Engel
by

UNITED STATES PATENT OFFICE.

DANIEL M. ENGEL, OF FAIRBANKS, WASHINGTON.

COUPLING FOR AGRICULTURAL MACHINERY.

1,060,441.  Specification of Letters Patent.  Patented Apr. 29, 1913.

Application filed August 1, 1912. Serial No. 712,749.

*To all whom it may concern:*

Be it known that I, DANIEL M. ENGEL, a citizen of the United States, residing at Fairbanks, in the county of Whitman and State of Washington, have invented new and useful Improvements in Couplers for Agricultural Machinery, of which the following is a specification.

The present invention has reference to couplers for agricultural machinery, and it comprehends, briefly, an improved device of the class specified which is designed primarily for attachment to the draft element of a threshing rig or the like, and for coöperation with the draft bar of a traction engine or its tender, the improvements in question relating more particularly to the working parts of the coupler proper, as hereinafter described at length, which parts are carried entirely by the aforesaid draft element and are so constructed and arranged as to have an automatic trip action during coupling and uncoupling.

An embodiment of the invention is illustrated in the accompanying drawing, whereof—

Figures 1 and 2 are, respectively, a side elevation and a plan view of the improved coupler applied to a draft element; Figs. 3 and 4 are enlarged longitudinal vertical sectional views showing the positions assumed by the various parts prior to and after coupling; Fig. 5 is a horizontal section taken on the line 5—5 of Fig. 4; and Fig. 6 is a vertical section taken on the line 6—6 of Fig. 5.

In said drawing, A and B indicate the two parts to be coupled, the part A being the usual draft bar adapted for attachment to the traction engine, or its tender, while the other part, B, is the draft element of the threshing rig or other machine and is here shown as in the nature of a tongue or pole. The coupler C is attached to the second-named part, which latter may advantageously consist, as in the construction illustrated, of main and auxiliary members $B^1$ and $B^2$, the first of these members being fixed to the rig, while the auxiliary member has a pivotal connection therewith and carries the coupler at its front end, the pivotal mounting of the said auxiliary member enabling it to be swung laterally to either side of the main member.

In the present embodiment of the invention, the auxiliary member is shown as comprising upper and lower bars 1 and 2 disposed, respectively, above and below the solid main member and pivoted at their rear ends to a vertical bolt 3 which passes through said main member and, also, through the perforated front ends of a pair of brackets 4 fixed to the top and bottom faces of the main member, the rear ends of the bars being interposed between the bracket ends and the aforesaid top and bottom faces. The front ends of the bars 1 and 2 are connected in any suitable manner to a horizontal casing 5 wherein the working parts of the coupler are disposed, the casing extending forwardly beyond said bars and in axial alinement with the same. The arrangement is such, therefore, that the auxiliary member $B^2$ of the part B may be considered as straddling the main member $B^1$ thereof, and the coupler C as carried by the front end of the said auxiliary member a slight distance in advance of the corresponding end of the main member. In this way, the auxiliary member may be swung to either side of the main member, and will be, in a sense, guided by the latter during its movements, thus permitting the engine, or its tender, to be connected to the rig while occupying an angular position with respect to the same; in other words, the coupling may be effected in cases where the relative positions of the engine and rig are such as to completely preclude coupling if the draft element of the rig were in the form of a single member rigidly secured to the rig.

Means are provided for locking the main and auxiliary members $B^1$ and $B^2$ together in axial alinement with each other, and, also, for effecting such action automatically when the movable auxiliary member $B^2$ reaches the position indicated. To this end, said members are furnished with complemental bolt and keeper parts 6 and 7 which are disposed respectively, in the present instance, upon the fixed and movable members. The bolt part or element 6 is preferably in the nature of a plunger controlled by a spring 8 and having its front and rear portions working in seats 9 and 10 formed, respectively, in the keeper 7 and in the front end of the member $B^1$, the aforesaid front portion passing also, through a perforation 11 formed in the forwardly projecting central portion of a yoke 12 whose legs are secured to the side faces of said member $B^1$, as depicted in Figs. 4, 5 and 6. The stem portion 13 of the bolt is slidable in a longitudinal groove 14 formed in one of the side faces of member B¹ and has an out-turned rear terminal 15 that serves as an operating handle, the said groove extending a slight distance rearwardly beyond the adjacent yoke leg, which latter covers it for the most part and thus serves to retain said stem in place therein. The complemental part or element 7 is formed by the rear wall of casing 5, and is provided with a pair of oppositely-extending lateral wings 16 whose rear faces are beveled or inclined toward each other, as shown in Fig. 5, the aforementioned seat 9 being located centrally of said element and between said wings. The arrangement is obviously such, therefore, that when the bolt proper is withdrawn from the seat 9, the auxiliary member may be swung to either side of the main member, as already stated; but when said auxiliary member is returned to its normal position in axial alinement with said main member, the front end of the bolt will ride along the beveled face of the adjacent wing of the keeper until it comes into alinement with seat 9, whereupon it will be automatically projected into seat under the influence of its spring 8, thus locking the two members together.

The coupler proper consists, preferably, of but two main parts, viz., a latch 17 coöperative with the draft bar A on the traction engine and a spring-controlled lock 18 associated with the latch, whereby maximum simplicity and minimum cost, relatively speaking, are obtained. The latch device is here shown as a single lever-like element which is pivoted upon a horizontal pin 19 that passes through the side walls of casing 5 adjacent to the upper edge of said element. The forward portion of said latch is enlarged, and its lower portion is slotted, vertically, as indicated by the numeral 20, slightly in advance of pin 19, while the rear portion is reduced to form a tail-piece 21 that projects toward lock 18 and is disposed above the two jaws 22 and 23 resulting from the formation of said slot. The front jaw 22 is disposed in advance of pin 19, and its front edge has an upward and forward slope, the rear jaw 23 being located below and approximately in line with pin 19 and having its rear edge sloping upwardly and rearwardly. It will be seen, therefore, that the latch will have a gravity or drop action, owing to the enlargement of its forward portion and the reduction of its rear portion, the front end of the casing and the forward portion of the top wall thereof being cut away to permit the requisite movement. Normally, the front jaw 22 of the latch projects a slight distance outwardly of the casing to facilitate its coöperation with the draft bar A, its terminal resting upon the slightly up-turned front end of the bottom wall. In consequence, when the engine, or its tender, is backed toward the draft element of the rig, the eye 24 of the draft bar will pass beneath the front jaw 22 of the latch, which latter normally occupies the position represented in Fig. 3, with the aforesaid front jaw slightly raised, and will strike against the rear jaw 23, thus rocking the latch downwardly upon pin 19 and causing jaw 22 to enter the opening in eye 24, whereupon the coupling is completed.

To retain the parts A and C coupled, the lock 18 is provided, as will be understood. Said lock is here shown as in the form of a vertically-disposed lever which is pivoted at its lower end to a cross-pin 25 carried by the side walls of casing 5, and is located slightly to the rear of the tail-piece 21, toward which latter it is normally pressed by a suitable spring 26 mounted within the casing. The desired locking action is effected by the normal engagement of the terminal of the tail-piece 21 with a shoulder 27 produced by enlarging the lower portion of the locking lever, such engagement precluding the upward rocking movement of the latch which is necessary to release the eye 24 from jaw 22. Disengagement may be effected, however, when it is desired to uncouple the aforesaid parts A and C, by extending the stem portion of the locking lever upwardly through a slot 28 formed in the top wall of the casing, this extended portion being either grasped and operated manually, or connected to an operating cord, cable, or the like, (not shown). To provide for a discharge of any grain, chaff or other foreign matter which may fall into casing 5 through slot 28, said casing is preferably formed at opposite sides with a pair of inclined holes 29.

In carrying out the uncoupling operation, the latch 17 is first unlocked, by moving the lever 18 rearwardly so as to disengage its shoulder 27 from the tail-piece 21, after which, the engine or tender is moved away from the draft element of the rig, such movement causing eye 24 to press against jaw 22 and, in consequence, rock said latch upwardly until said eye passes out of engagement with said jaw. When the terminal of tail-piece 21 passes below shoulder 27 on lever 18, during the uncoupling operation, said lever is released and is then free to bear against said tail-piece, its pressure holding the latch, at the conclusion of the uncoupling, in the raised position depicted in Fig. 3 and hereinabove referred to as its normal position.

The operation of the entire invention is believed to be apparent from the foregoing, and, hence, to require no separate or additional explanation.

I claim as my invention:

1. A coupler comprising, in combination, a fixed main member provided with a yoke whose legs are secured to the opposite side faces thereof, the central portion of said yoke and the front end of said member being formed with alining perforations; a swinging auxiliary member pivoted at its rear end to the main member, and having a casing, said casing being provided at its rear end with a perforated keeper; coupling means mounted in said casing; and a spring-controlled bolt having its ends fitted in the perforations in said yoke and main member and its front end adapted for engagement with the perforation in said keeper when the last-named perforation is in alinement with the first-named perforations, to lock said main and auxiliary members together.

2. A coupler comprising, in combination, a fixed main member provided with a yoke whose legs are secured to the opposite side faces thereof, the central portion of said yoke and the front end of said member being formed with alining perforations; a swinging auxiliary member pivoted at its rear end to the main member and having a casing at its front end, said casing being provided at its rear end with a perforated keeper; coupling means mounted in said casing and embodying a pivoted latch and a lock associated therewith; and a spring-controlled bolt having its ends fitted in the perforations in said yoke and main member and its front end adapted for engagement with the perforation in said keeper when the last-named perforation is in alinement with the first-named perforations, to lock said main and auxiliary members together.

In testimony whereof I have hereunto set my hand in presence of two subscribing witnesses.

DANIEL M. ENGEL.

Witnesses:
HENRY J. CLARK,
WESLEY J. HENGLER.

Copies of this patent may be obtained for five cents each, by addressing the "Commissioner of Patents, Washington, D. C."